United States Patent
Henriksen

(10) Patent No.: US 6,623,600 B1
(45) Date of Patent: Sep. 23, 2003

(54) METHOD OF PERFORMING AN IMPREGNATING OR EXTRACTING TREATMENT ON A RESIN-CONTAINING WOOD SUBSTRATE

(75) Inventor: Ole Henriksen, Alborg (DK)

(73) Assignee: Supertrae A/S (DK)

( * ) Notice: Subject to any disclaimer, the term of this patent is extended or adjusted under 35 U.S.C. 154(b) by 0 days.

(21) Appl. No.: 09/831,569

(22) PCT Filed: Nov. 4, 1999

(86) PCT No.: PCT/DK99/00601

§ 371 (c)(1),
(2), (4) Date: Jun. 18, 2001

(87) PCT Pub. No.: WO00/27601

PCT Pub. Date: May 18, 2000

(30) Foreign Application Priority Data

Nov. 10, 1998 (DK) ......................... 1998 01456

(51) Int. Cl.[7] ................................. D21B 1/36
(52) U.S. Cl. ................. 162/21; 162/22; 162/63
(58) Field of Search ............... 162/21, 22, 63, 162/72; 268/761, 762; 588/204; 260/110, 97.7; 524/13, 14, 16

(56) References Cited

U.S. PATENT DOCUMENTS

| | | | |
|---|---|---|---|
| 4,202,320 A | 5/1980 | Knitted et al. | |
| 4,308,200 A | 12/1981 | Fremont | |
| 4,992,308 A | 2/1991 | Sunol | |
| 5,041,192 A | 8/1991 | Sunol et al. | 162/63 |
| 5,094,892 A | 3/1992 | Kayihan | |
| 5,364,475 A | 11/1994 | Levien et al. | 134/42 |
| 5,476,975 A | 12/1995 | Ruddick et al. | 568/762 |
| 5,665,798 A | * 9/1997 | Speaks et al. | 524/14 |
| 5,785,856 A | 7/1998 | Gleave et al. | 210/634 |

FOREIGN PATENT DOCUMENTS

| | | | |
|---|---|---|---|
| CA | 553951 | * | 3/1958 |
| DE | 4202320 A1 | | 8/1993 |
| WO | 95343600 | | 12/1995 |
| WO | WO 00/27547 | * | 5/2000 |

OTHER PUBLICATIONS

Database STN International (Online); ACDA Menandro et al.: "Effect of Process Variable on Supercritical Fluid Impregnation of Composites With Tebuconazole", retrieved from CAPLUS, accession No. 1997:430609, Database accession No. 127:67543, XP002900897, abstract & Wood Fiber Sci., vol. 29, No. 3, 1997, pp. 282–290, ISSN: 0735–6161.

Database STN International (Online); Sahle–Demessie E et al.: "Impregnation of Wood Biocides Using Supercritical Fluid Carriers", retrieved from CAPLUS, accession No. 1995:965926, Database accession No. 124:32286, XP002901022, abstract & ACS Symp. Ser., vol. 608, 1995, pp. 415–428, (Innovations in Supercritical Fluids), ISSN: 0097–6156.

J. J. Morrell, et al., Development of New Treatment Processes for Wood Protection, Oregon State University, Corvallis, Oregon, pp. 135–141.

Herve Van Oost, et al., Traitement de l'epicea en milieu supercritique, AIR–LIQUIDE—Centre de Recherche Claude Delorme pp 8–11.

Patent Application: Harpiks A, Purging, A Method of Performing an Impregnating or Extracting Treatment on a Resin–Containing Wood Substrate, (1998) DK 1455/98.

* cited by examiner

*Primary Examiner*—Dean T. Nguyen
(74) *Attorney, Agent, or Firm*—Ostrolenk, Faber, Gerb & Soffen, LLP

(57) ABSTRACT

In impregnating or extracting treatments of resin-containing wood substrates using a resin-soluble supercritical fluid as delivering or extractive solvent medium problems due to exudation of resin from the wood substrate at pressure release necessary before the termination of the treatment are avoided or reduced by a controlled pulsating pressure release down to atmospheric pressure. Thereby the total process time can be substantially reduced.

18 Claims, 4 Drawing Sheets

METHOD OF PERFORMING AN IMPREGNATING OR EXTRACTING TREATMENT ON A RESIN-CONTAINING WOOD SUBSTRATE

FIELD OF THE INVENTION

The present invention relates to impregnation or extraction of wood using a supercritical fluid as carrier for the substance impregnated into the wood or as extractive medium.

More particularly the invention relates to impregnating or extracting treatment of resin-containing wood and enables an expansion of the field of wood treatments using fluids in supercritical state.

BACKGROUND OF THE INVENTION AND PRIOR ART

Use of fluids under supercritical conditions offers substantial advantages in operations involving perfusing of a porous material for extractive purposes or for impregnation.

The advantages of using fluids under supercritical conditions over conventional processes using organic solvents or water as extracting or carrying medium at conditions of temperature and pressure in which the liquid stage is maintained, can be important and include the following features.

Supercritical fluids, possibly including minor amounts of co-solvents, are able to perfuse or penetrate porous materials quicker and more efficient than liquids, thereby enabling a more uniform impregnation or extraction in the interior of the material being treated and also enabling impregnation or extraction of materials regarded as a nearly impermeable to liquids.

The fact that supercritical fluids are almost as dispersible as gases facilitates an even contact with the porous substrate to be treated. Further, the fact that the solubility of several substances in supercritical fluids is highly pressure dependent enables an efficient deposition of such substances in the interior of the porous substances by pressure reduction following impregnation with supercritical solutions at higher pressures.

Supercritical fluids have also been suggested for the extraction, and especially the impregnation, of wood where the potential advantages include not only improved efficiency of the treatments but also involve substantial environmental improvements both in the performing of the treatment and possible post conditioning and in the subsequent use and disposal of the treated wood articles.

For further description of supercritical fluid treatments of wood materials reference is made to the following.

An article of Morrell & Levien: "Development of New Treatment Processes for Wood Protection" Conference Report from "Conference on Wood Preservation in the '90s and Beyond", Savannah, Georgia USA, Sep. 26–28 1994 which deals with impregnation of wood species normally resistant to impregnation, by using supercritical carbon dioxide to deliver and deposit biocides into said wood. The potential for completely impregnating virtually all wood species also with biocides not previously regarded as suitable, is discussed. The supercritical fluid treatments are described as representing the first truly revolutionary improvement in treatment in this century, although it is admitted that a substantial amount of research and testing will be required before these systems become commercially feasible.

Also a paper by Hervé van Oost, Philippe Eymard and Michel Gastiger: "Traitement de l' épicéa en milieu supercritique", Info Critt No. 6, 1995, provides a general description of the use of supercritical fluids for conservating treatment of wood, especially spruce. Based on laboratory experiments using carbon dioxide as supercritical fluid with possible addition of alcohol it is expected that the technique could be developed into commercial scale not only for introducing pesticides, but also for impregnation of wood with a view of improving physical characteristics thereof.

U.S. Pat. No. 5,094,892 comprises a review of prior art methods utilizing supercritical fluids for various purposes comprising deposition of various materials into a porous substrate or extraction of materials from such substrates. The latter process may be performed to recover valuable extracts or to improve characteristics of the substrate. The patent concentrates on the improvement obtainable by using co-solvents when perfusing wood, using typically carbon dioxide as supercritical fluid. Among the advantages also this patent emphasizes a uniformly impregnating of otherwise difficultly permeable materials.

Similar information can be found in U.S. Pat. No. 4,992,308 which i.a. describes impregnation using monomers which are polymerized in situ.

U.S. Pat. Nos 5,364,475 and 5,476,975 both deal with the extraction of organic toxic contaminations from wood using supercritical carbon dioxide.

Also delignification of wood has been suggested in the above mentioned U.S. Pat. No. 4,992,308 and in U.S. Pat. No. 5,041,192.

WO-A-95/34360 describes an analytical extraction process using a solvent under high temperature and pressure but not in the supercritical state. After the extraction a purging or flushing step is performed which transports the extraction fluid into a collection chamber. The purging or flushing step utilize another fluid than the one used in the extraction process.

U.S. Pat. No. 5,785,856 describes an apparatus that is particular adapted to perform the extraction process described in WO-A-95/34360 in an automated fashion, but which also may be operated under supercritical conditions. An example of suitable purging fluid is nitrogen under high pressure. It is noted that beside transporting the extraction fluid to a collection chamber the purging step has the further advantage of drying the extracted material.

U.S. Pat. No. 4,308,200 describes a process for extraction of coniferous woods with supercritical fluids to recover tall oil and turpentine or compounds thereof. It is described that the extract bearing fluid is stripped of the extracts by reducing the pressure in stages, each pressure reduction effecting removal of extracts of a defined molecular weight range.

In spite of the fact that treatment of various materials by perfusion thereof to perform extraction or impregnation, in principle may advantageously be carried out using a supercritical fluid as carrier in the perfusion process, such processes have hitherto not found commercial application, at least not at the level which could be expected in view of their potential advantages.

Especially within one of the largest potential application areas, namely in the treatment of wood substrates, these processes have, to the best knowledge of the present inventors, not achieved large-scale commercial use.

The present inventors have conducted extensive research with a view of developing and improving processes of the discussed type, expecially for treatment of resin-containing wood substrates.

In the present specification and the attached claims the term "wood substrate" designates a substrate for the impregnation or extractive process which may typically be a shaped or partially shaped wood article, structural wood, timber, poles etcetera, but encompasses also materials comprising comminuted wood such as chips or building plates etcetera.

By said research and experiments it has turned out that an important feature which may be at least partly responsible for the lacking or very restricted commercial application of perfusion processes using supercritical fluids in wood products, is the contents of resin in most of such wood products. Such resin may under the influence of the supercritical fluid cause deterioration of the resulting products and/or operational complications.

In this context the term "resin" denotes the high viscous liquid of lipophilic or hydrophobic character present in amounts of typically some percent by weight in most types of wood, especially in wood from coniferous tres. Such resin is a very complex mixture of various substances including relative volatile components such as terpenes, whereas the main component is a mixture of non-volatile, partly unsaturated compounds including esters and free acids. The resin forms an extremely sticky gum which is capable of undergoing a certain slow hardening when exposed to the air.

The resin is normally present as small drops within the cells forming the wood structure.

Most of the substances coming into consideration as supercritical fluid in the wood perfusing processes, coming into consideration herein, including primarily carbon dioxide and hydrocarbons, such as ethane, propane and buthylene, as well as certain auxiliary substances suitable as adjuvants in the fluid, are soluble in resin and during the extractive or impregnative perfusion processes a substantial amount thereof is dissolved in the resin present in the interior of the wood.

As can be shown in experiments using samples of pure resin extracted from wood, the viscosity and surface tension of the resin are such that carbon dioxide or volatile hydrocarbons dissolved therein at high pressure in the supercritical perfusion process only escapes slowly when the pressure is reduced and therefore the pressure reduction involves extensive formation of bubbles and foam.

When the superatmospheric pressure, typically 50–100 bar, used in the hitherto suggested processes for perfusion of wood substrates, is released, a similar phenomenon occurs and the bubble formation in the individual droplets of resin causes the resin to be exudated to the surface of the wood substrate from where a part of it may be entrained by the leaving fluid and form deposits on the interior walls and exhaust pipes of the treatment chamber.

In case the wood substrate is a shaped wood article, the resin present as a layer on the surface thereof after termination of the treatment prevents immediate application of further finishing treatments, such as painting, varnishing etcetera, and the surface achieves an inattractive sticky character.

Also on timber and constructional wood intended for subsequent shaping operations the presence of the resin on the surface will often be unacceptable.

Due to the physical character and insolubility in water of the resin, deposits thereof in the chamber and connected pipes may create substantial operational problems and expenditure. These last mentioned problems also exist when the wood substrate is comminuted wood, such as chips or building plates comprising comminuted wood. As mentioned above such materials may be treated for extractive or impregnative purposes.

The higher the maximum pressure is in the perfusion process the more pronounced and disturbing are the problems caused by resin exudation. Thus, said problems have in fact made the process unattractive for treating certain difficultly perfusable substrates requiring very high pressure for effective treatment.

As a first attempt to avoid or reduce the problems caused by the above exudation of the resin from the interior of the wood substrate experiments have been made using very slow and thus prolonged exhaustion of the fluid in supercritical state and thus a very slow pressure release.

Although this measure in principle is efficient to mitigate the problems caused by exorbation of resin, it has turned out that to reduce said exorbation sufficiently the pressure release has to be so slow that the time period necessary for completing said pressure release before emptying the treatment chamber becomes so extended that the total capacity of the process and the plant used therein is decreased to levels seriously impairing the competitiveness of the total extraction or impregnation process.

Thus, there is a substantial need for measures to avoid excessive exorbation of resin from wood substrates when these are subjected to pressure release after supercritical fluid perfusion operations, without the necessity of using a prolonged release time. Avoidance of resin exorbation would not only solve or diminish the above problems but also widen the area of applicability for the processes to substrates which can only be perfused at very high pressures, such as wood having a high proportion of heartwood.

COPENDING ART

One approach to fulfil this need and meet the described problems is subject of the co-pending Danish patent application No. 1455/98, filed the same date as the present application. The present invention fulfils said need using different measures.

SUMMARY OF THE INVENTION

The present invention is based on the recognition that during the pressure release the portion of the fluid used in supercritical state, which is dissolved in the resin, may be allowed to evaporate therefrom relatively fast without formation of bubbles and resin exorbation, if the partial pressure of the substance forming the supercritical fluid is reduced stepwise with intermediate pressure increase as defined below.

Thus, the present invention deals with a method of performing an impregnating or extracting treatment on a resin-containing wood substrate using a fluid in supercritical state as delivering or extractive solvent medium which fluid in supercritical state is soluble in the resin present in the wood substrate, comprising the steps of
 (i) introducing the wood substrate into a pressure tight treatment chamber,
 (ii) introducing a stream comprising said fluid into the chamber and adjusting the pressure and temperature therein to ensure the fluid being present in supercritical state and to promote penetration of the fluid and any substances dissolved therein into the wood substrate,
 (iii) maintaining contact between the wood substrate and fluid in supercritical state for a time period sufficient to obtain the desired penetration, whereby also a certain dissolution of the fluid into the resin takes place, (iv) after a possible purging of the chamber with said fluid in supercritical state, releasing the pressure in the chamber down to ambient pressure, and (v) withdrawing the treated wood substrate from the chamber, and the method is characterized in that the releasing step (iv) comprises the features:

(a) starting releasing the pressure at a rate which, if it were continued until atmospheric pressure were reached, would cause exudation of resin from the interior of the wood substrate to the surface thereof due to bubble forming expansion of the fluid dissolved in the resin in step (iii), (b) interrupting said releasing at a first pressure level before harmful exudation of resin to the surface of the wood substrate takes place, (c) increasing the pressure to a second level above said first level but below the pressure maintained in step (iii), (d) immediately after reaching said second pressure level resuming pressure release to decrease the pressure to a third level below said first level, (e) subsequently at least once repeating a release operation comprising pressure increase to a level below the maximum level of the immediately preceding release operation, instantly followed by pressure decrease to a level below the minimum level of the immediately preceding release operation, wherein the number of release operations in (e) and the pressure levels in each of these operations as well as in the steps (b), (c) and (d) are previously fixed on basis of simple experiments, using relevant specimens of wood or resin, to obtain a shorter total release time (a)+, (b)+, (c)+, (d)+ and (e)+ without harmful resin exudation, than would have been possible if the pressure were released by a continous, uninterrupted withdrawal of the fluid.

In one of the preferred embodiments of the method the increase of pressure in (c) and preferably also in (e) is performed by introducing the same species of fluid as used as delivering or extracting supercritical solvent medium. Thereby it is omitted that the gas flow recovered from the method is mixed up with foreign gases. Therefore it can be reused without extensive separation or purification, and the method can be performed with only a very moderate waste of the gas used as supercritical solvent medium.

However, in case a very short process time and thus a fast pressure decrease is paramount, the process of the invention can be embodied using the principle forming basis for the above mentioned co-pending Danish patent application incorporated herein by reference. In this embodiment the increase of pressure in (c) and also in (e) is performed by introducing a fluid which is less soluble in resin than the fluid used as delivering or extracting solvent medium. Thereby the number of release operations and pressure increase operations specified above under (e) can be reduced and/or the pace of each pressure releasing operation can be increased to obtain a total reduced process time.

As it appears from the introductory portion of this specification, the method of this invention involves advantages for both impregnation and extraction processes in connection with substrates comprising articles of wood as well as comminuted wood materials and articles comprising such. However, currently most experiments and experiences have been obtained in connection with impregnation of wood as such, and thus a preferred embodiment of the process is characterized in that a resinous wood is impregnated with one or more biocides such as fungicides or insecticides. Tests have especially been carried out using wood from a coniferous tree, preferably selected from spruce (*pica*), fir (*abies, pseudotsuga*), hemlock (*tsuga*) and pine (*pinus*) including larch (*larix*), which is impregnated using a wood preserving agent comprising at least one fungicide or other biocide.

The process may also be advantageous for treating hardwood, such as beechwood, to obtain a uniform dying through the complete interior thereof.

Due to physical and chemical properties as well as availability and costs and lacking toxicity and non-flammability, carbon dioxide, possibly together with a minor amount of a solubility promotor such as an alcohol or ketone, is the preferred fluid used in supercritical state when the purpose is to impregnate wood by means of an organic fungicide or insecticide. However, hydrocarbons can also be used for this purpose, especially such having from 2–4 carbon atoms.

However, such hydrocarbons are easily soluble in resin just as carbon dioxide is, and their release from said resin, when the pressure is reduced, may cause the problems explained above.

If the increase of pressure in (c) and (d) is performed by introducing a fluid which is less soluble in resin than the fluid used as delivering and extracting medium, this fluid may typically be nitrogen or atmospheric air which do not dissolve in the resin to such an extent that their release therefrom causes problems.

In a typical application of the process resinous wood from a coniferous tree is impregnated with at least one organic biocide using carbon dioxide as the supercritical fluid acting as delivering solvent medium, and the contact in step (iii) is maintained for 5–60, preferably 10–30, minutes at a pressure of 20–500, preferably 50–400, more preferably 60–150 bar and at a temperature of 31–80° C., preferably 31–65° C., and the step (iv) comprising the features (a), (b), (c) and (d) is completed within a period of 0.5–5 h, preferably 1.5–4 h, more preferably 100–200 minutes.

Typically the feature (e) comprises 1–20, preferably 3–10, operations, each consisting of a relatively fast pressure increasing measure and a slower pressure decreasing measure.

Addition of certain organic solvents to the supercritical fluid, especially when the latter is carbon dioxide, has been described as widening the pores of wood substrates to be perfused. Further, such solvents may be selected to improve the solubility of certain biocides or other substances which it is desired to impregnate into the wood substrate.

Thus, a preferred embodiment of the method is characterized in that to increase the delivering or extractive ability of the fluid in supercritical state an organic co-solvent is added to said fluid.

Solvents can also be used with the purpose of bringing the substance(s) to be infused into the substrate in liquid, low viscous state to facilitate handling and especially dosing thereof.

In case the method is used for impregnating wood substrates to resist attack from fungi and/or insects, several biocides come into consideration.

Thus, as example of suitable fungicides copper salts, such as copper naphtenate and copper linolate and similar derivatives may be mentioned.

Also propiconazole or tebuconazole are fungicides which currently are accepted and commercially used for wood impregnation.

Experiments have shown that these two fungicides by the method of the invention using carbon dioxide as supercritical fluid can be dispersed evenly in the wood in concentrations sufficient for the desired preservation. Especially a combination of propiconazole and tebuconazole seems suitable.

However, the process of the invention is in no way restricted to biocide impregnation of wood substrate, but it is also suitable for impregnation of wood substrate with one or more of the species of the groups: colorants, fireproofing agents, and other agents imparting specific qualities, e.g. strength-improving agents such as agents which are polymerized in situ after having been dispersed within the wood structure.

A further example of a field of application for the method is extraction of a wood substrate to remove components therein, which would cause discoloration such as certain metal compounds and tannin-like compounds. Also extraction of valuable wood components comes into consideration.

To further explanation of the invention and certain embodiments thereof reference is made to the drawings.

DETAILED DESCRIPTION

For general information concerning equipment suitable for extracting or impregnation treatments using supercritical fluids reference is made to the above cited literature and patents, all incorporated herein by reference.

Figure 1:
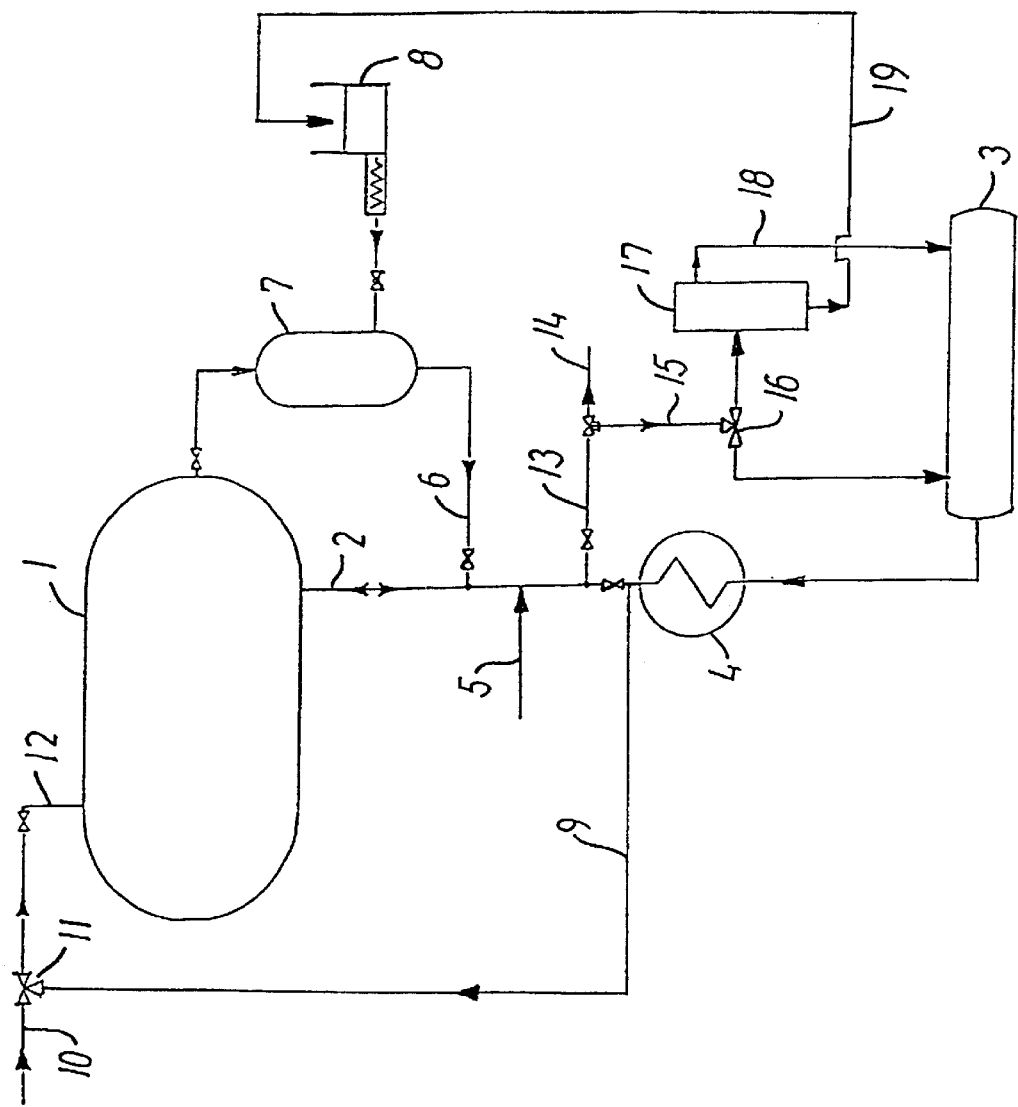
FIG. 1 very schematically depicts a layout for a plant suitable for performing typical embodiments of the method of the invention.

FIG. 1 schematically shows principal elements in an embodiments of a plant suitable for carrying out an impregnation embodiment of the method of the invention, however, omitting pumps, probes, pressure and flow indicators, thermometers and other equipment for monitoring the method.

Also equipment for automation of the process is omitted, since various measures for this purpose will be evident to the person skilled in the art.

On FIG. 1 an impregnation chamber 1 is built to withstand an interior pressure of up to for instance some hundreds bar. The chamber is provided with at least one large dimensioned port or lid for introducing of wood to be impregnated and for removal thereof after completion of the impregnation process. Said port or lid is not shown on the drawing.

The chamber 1 is connected to various conduits.

Thus, 2 is a conduit for introducing and removal of supercritical fluid and other substances as will appear from the below more detailed explanation.

For the sake of simplicity it is in the following assumed that the fluid used in supercritical state is carbon dioxide.

The main reservoir for carbon dioxide is the tank 3 connected to the chamber 1 through the conduit 2.

A heat exchanger 4 is provided for adjusting the temperature of the carbon dioxide pumped from the tank 3 to the chamber 1.

A conduit 5 enables introduction of one or more co-solvents into the stream of carbon dioxide to increase the solubilizing ability of the latter towards the biocide(s) or other substance used in the process.

A conduit 6 provides adjustable connection between the conduit 2 and an enrichment unit 7. This unit 7 also receives a conduit directly from the chamber 1.

8 is a reservoir for biocide or other impregnating substance, preferably as a solution in an organic solvent. The contents of the reservoir 8 can be adjustably dosed to the unit 7.

A conduit 9 enables delivery of carbon dioxide from conduit 2, in the shown embodiment from a location downstream of the heat exchanger 4, to the impregnation chamber 1 to introduce essentially biocide-free carbon dioxide therein.

A conduit 10, which is of special relevance in connection with the above described embodiment of the present invention, in which also a second fluid of low solubility in resin is used. Conduit 10 enables introduction of a fluid having a lower solubility in resin than the solubility of carbon dioxide therein. A multi-functional valve 11 combined with other adjustment systems controls whether this fluid or carbon dioxide shall be introduced into the chamber through a conduit 12 or whether passage therethrough shall be closed.

In case the plant has two or more impregnation chambers (not shown), the valve 11 may be part of a manifold unit.

The conduit 2 also serves to remove fluid from the chamber 1, in which case said fluid passes to conduit 13 from where it can be either vented through 14 or passed to a further conduit 15 from where it, by means of a valve 16 is directed either to the tank 3, which applies if the fluid is substantially pure carbon dioxide, or to a separator unit 17 in which separation into relative pure carbon dioxide and non-used biocide is performed.

The carbon dioxide is through conduit 18 conducted to the tank 3 whereas the fungicide through conduit 19 is lead to the biocide reservoir 8.

When performing an embodiment of the present method, the depicted plant may for instance be used as follows:

When using the plant depicted in FIG. 1 for biocide impregnation of wood, a first measure will typically be to introduce the wood to be impregnated into the chamber 1. Due to the high and quick perfusion of supercritical fluids the wood may be packed very dense in said chamber without taking such measures to ensure an even distribution of the fluid which are necessary in conventional impregnation processes using liquid carrier for the biocides.

After introduction of the wood into the chamber 1 the latter is closed and introduction of carbon dioxide from the tank 3 via the heat exchanger 4 is made through conduit 2. From the conduit 5 this supply of carbon dioxide receives a suitable amount of co-solvent, typically some percent by weight of alcohol or ketone.

During this part of the process the conduit 12 is closed.

Introduction of carbon dioxide, possibly with the additives mentioned is continued until the pressure in the chamber 1 is approximately 120 bar and the temperature for instance approximately 50° C.

The time used for reaching the desired pressure will typically be from a few minutes up to 30 minutes.

Figure 2:
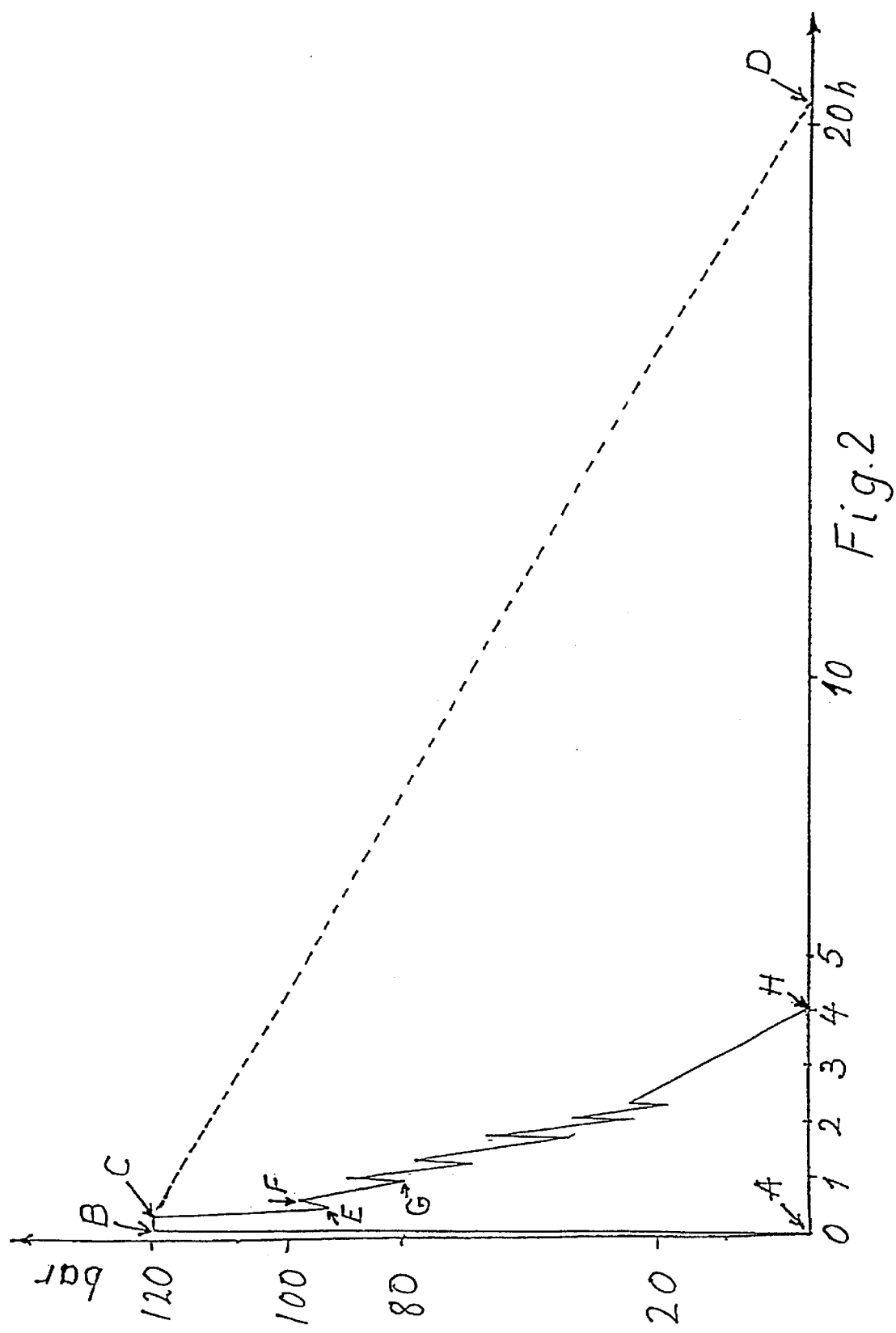
FIG. 2 is two graphs depicting the pressure as a function of the treatment time in an embodiment of the method of the invention and in a conventional method, resp.

On FIG. 2 showing a graph indicating the pressure in bar as function of the time expressed in hours, this portion of the method corresponds to the line from point A to point B. Remark that the ordinate axis is not drawn to scale.

At this time a circulating flow is initiated from the chamber 1 to the unit 7 and from there through the conduits 6 and 2 back to the chamber 1. During this circulation the carbon dioxide is enriched with biocide or other substance introduced from the reservoir 8, and the carbon dioxide circulation is continued until the desired amount of biocide or other substance has been dissolved in and entrained by the carbon dioxide flow.

The pressure in the impregnation chamber 1 is maintained at approximately 120 bar for for instance 20 minutes. This corresponds to the portion B–C of the graph on FIG. 2.

At the termination of this part of the method carbon dioxide without biocide can be blown through the chamber 1. This may be accomplished by conducting carbon dioxide at suitable temperature through the conduit 9, the valve 11 and the conduit 12.

This carbon dioxide displaces the biocide containing carbon dioxide from the chamber and forces it through the conduits 2, 13 and through valve 16 to the separator unit where, preferably after a suitable pressure reduction, the biocide is separated, and conducted via 19 to the reservoir 8, whereas the carbon dioxide essentially free of biocide is lead via conduit 18 to the tank 3.

When substantially all biocide not bound in the wood has thus been flushed out of the chamber, the valve 16 may be adjusted to conduct the now essentially pure carbon dioxide reaching said valve directly into the tank 3.

At the moment corresponding to C on FIG. 2 the introduction of carbon dioxide through 9, 11 and 12 is temporarily stopped and the pressure in the chamber 1 is decreased by continuing withdrawal of carbon dioxide through 2, 13, 15 and 16 to the tank 3.

If the above described problems caused by the resin in the wood being impregnated were to be avoided simply by reducing the rate of carbon dioxide removal from the chamber, pressure release from the impregnation pressure of 120 bar down to atmospheric pressure would typically take approximately 20 hours. Such a slow or prolonged pressure release is indicated on FIG. 2 by the dotted line from C to D.

However, in a typical embodiment of the present method a partial pressure release takes place within a few minutes as indicated on FIG. 2 by the line from C to E. However, this possibly rather fast pressure release is stopped at point E before any damage due to resin occurs on the surface of the wood or on the inner walls of the equipment.

At the time corresponding to E on FIG. 2 the fluid stream leaving the chamber 1 through 2, 13 and 15 is interrupted and a relatively fast pressure decrease takes place up to the point, which on FIG. 2 is indicated as the peak F.

During the pressure release from C to E minor bubbles of resin might be observed at the surface of the wood substrate being treated, but during the following pressure increase from E to F such resin bubbles disappear without leaving any harmful resin exudation.

From F the pressure is decreased down to G, where a certain pressure increase is again created in the chamber. This pulsating pressure decrease is continued down to atmospheric pressure at H, and in the embodiment illustrated in FIG. 2 the process of the invention is thus completed within approximately four hours, compared to more than twenty hours for the process using constant pressure decrease rate as illustrated by the dotted line.

It is assumed that the beneficial result obtained by the present invention is based on the fact that resin exudation or bubble formation created in the various pressure decreasing steps as a result of expansion and evaporation of the supercritical fluid dissolved in the resin is pressed back or prevented by the pressure increasing steps, while on the other hand the duration and pressures in the latter do not cause any significant re-dissolution of supercritical fluid into the resin.

However, the invention is not limited to any specific theory for the reason why the proposed measure enables the dramatic increase of total process capacity as reflected in FIG. 2 where the time from process start to termination of pressure release is reduced by approximately 80%.

In the embodiment in which the above main principle of the invention is combined with a displacement of the supercritical fluid, typical carbon dioxide, by a second fluid being substantially less soluble in resin, this second fluid is introduced from the conduit 10 through the valve 11, for instance at a time corresponding to E or G in FIG. 2 to allow a previous recovering of the first supercritical fluid without substantial admixture with said second fluid.

After the pressure has been released down to atmospheric, the chamber 1 is opened and the wood withdrawn, ready for immediate delivery to customers without necessity for drying or other conditioning.

The method of the invention is further illustrated by means of the following Comparison and Embodiment Examples.

EXAMPLES

Since the suitability of perfusion processes using carbon dioxide as supercritical fluid for obtaining an efficient impregnation of pinewood is well recognized, the aim of the tests described below are to illustrate conditions resulting in resin exubation and the means for avoiding such exubation by the process of the present invention. Consequently the tests were performed without using any biocide or other wood improving substances.

All tests were made on samples of pinewood dried to a moisture content of appromixately 12% b.w. Each sample was a planed rod having the dimensions 2.5×2.5×20 cm.

Carbon dioxide was used as primary gas to form the supercritical fluid. This carbon dioxide was of a grade suitable for foodproducts and having a purity of at least 99.9 vol %.

In the tests, where a displacement gas was used, this was nitrogen or atmospheric air.

TEST EQUIPMENT

Figure 3:
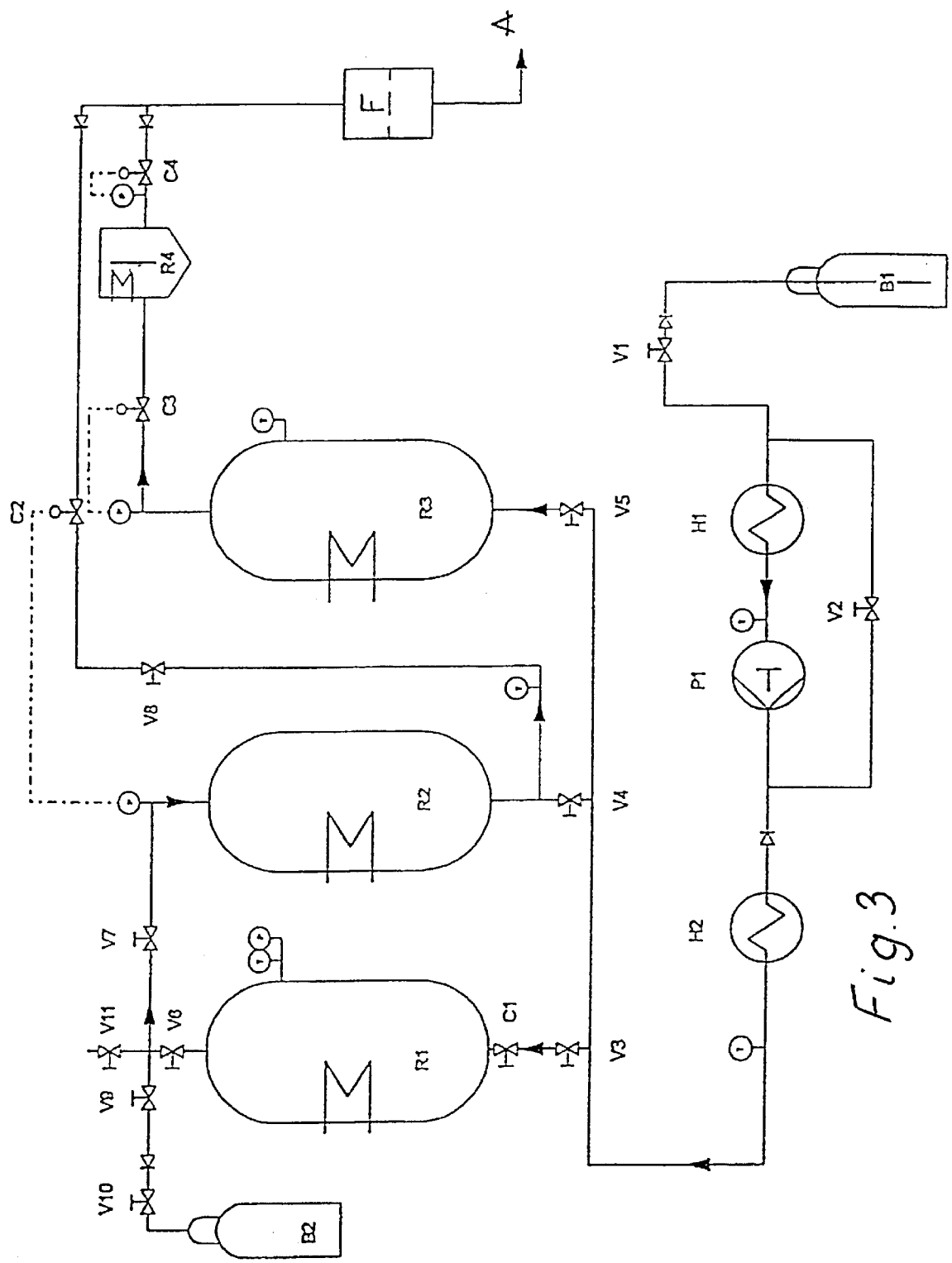
FIG. 3 is a diagrammatical representation of the experimental scale laboratory equipment used in the Embodiment and Comparison Examples described below.

All tests were made using equipment the layout of which is shown in FIG. 3. The various components indicated on this Figure are as follows:

B1: Carbon dioxide reservoir
B2: Displacement or purge gas V1–V11: Closing valves
C1: Control valve for manual adjustment
C2: Programmable pressure controlling valve having display of the fixed value and the actual value C3, C4: Pressure adjusting valves
R1: Heated buffer tank, 1 l., 75° C.
R2: Impregnation reactor, 1 l., 20–80° C.
R3: Dummy reactor, 1 l., 20–80° C.
R4: Separator, 1.5 l., 50° C.
H1: Condenser, −5° C.
H2: Heat exchanger, 20–80° C.

P1: Membrane pump having. adjustable flow, 1–14 l./min. at 150 bar

F: Filter

A: Vent

P: Pressure sensors

T: Temperature sensors.

GENERAL PROCEDURE

In each test two samples were marked, any special phenomenons such as collapsed cells, resin pockets etcetera were recorded and each sample was divided into two whereafter one half of both samples was placed in R2 while the other half was kept for reference. V1, V2 and V5 were opened, P1 was started and C3 was adjusted to the desired impregnation pressure plus approximately 5 bar. After approximately ten minuts the pump P1 had been cooled sufficiently to allow closure of V2, whereupon the pressure downstream of the pump and in R3 slowly increased to the desired pressure.

Then V3, V6, V7 and V8 were opened. The controller on C2 was started and the pressure in R1 and R2 was adjusted manually by means of C1 until the impregnation pressure was reached. Thereafter V3 was closed and P1 is stopped. When the time for impregnation was finished, V7 was closed and R1 emptied via V11. The pressure in R2 was then adjusted to obtain the desired pressure profile using the programmable pressure adjusting valve C2. When the pressure reached atmospheric pressure, R2 was opened and the samples taken out and inspected. Any changes were recorded.

Comparison Examples

Due to the relatively open cell structure of pinewood, the pressure increase could take place relatively fast, that means approximately 15 bar/min. The pressure was then maintained for twenty minutes (this also applies to the below Embodiment Examples) to simulate an impregnation in which this period is regarded as suitable for the active substances to penetrate into the wood.

Four tests were conducted using a pressure release rate of 10, 1, 0.1 and 0.5 bar/min., resp.

Figure 4:
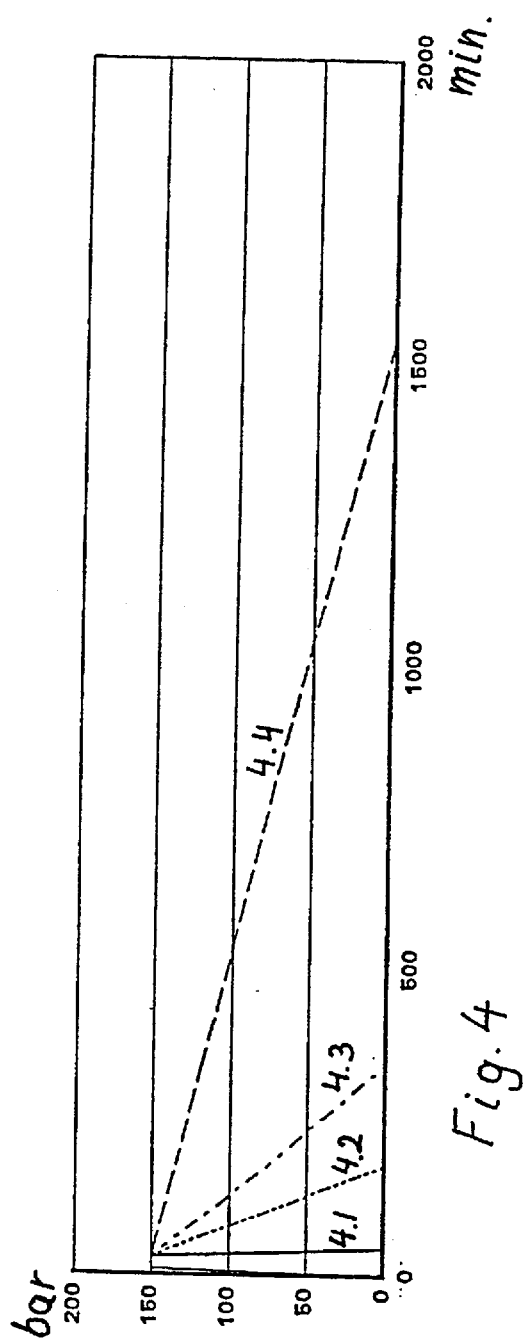
FIGS. 4 and 5 are pressure/time graphs relating to said Comparison and Embodiment Examples, resp.

The pressure release at constant rate in these four tests is illustrated in FIG. 4.

Details concerning these tests and the results as to resin exudation appear from the below Table 1, in which the test numbers correspond to those used in FIG. 4.

TABLE 1

Pressure Decrease at Constant Rate

| Test # | Pressure increase bar/min. | Pressure decrease bar/min. | Process time min. | Result |
|---|---|---|---|---|
| 4.1 | 15 | −10 | 45 | Excessive resin exudation all over on both samples |
| 4.2 | 15 | −1 | 180 | Distinct, unacceptable resin exudation at the sample ends, at autumn wood and around knots |
| 4.3 | 15 | −0.5 | 345 | Very slight/neglectible resin exudation at the end wood and around knots |
| 4.4 | 15 | −0.1 | 1545 | No visible alterations |

As it appears from Table 1, a total process time of more than 5½ hours is required if the quality of the wood surface shall be similar to the one, which can be obtained in the prior art processes. Since these prior art processes use process period from 2–4 hours, it is essential to shorten the process time to make the processes based on supercritical medium competitive.

Examples using Pulsating Pressure Release

In these three tests the pressure increase and residence time at constant elevated pressure were as in the Comparison Examples above. However, the pressure decrease was performed in three stages combined with a displacement of the carbon dioxide in supercritical state by nitrogen, which does not dissolve in the resin.

Figure 5:
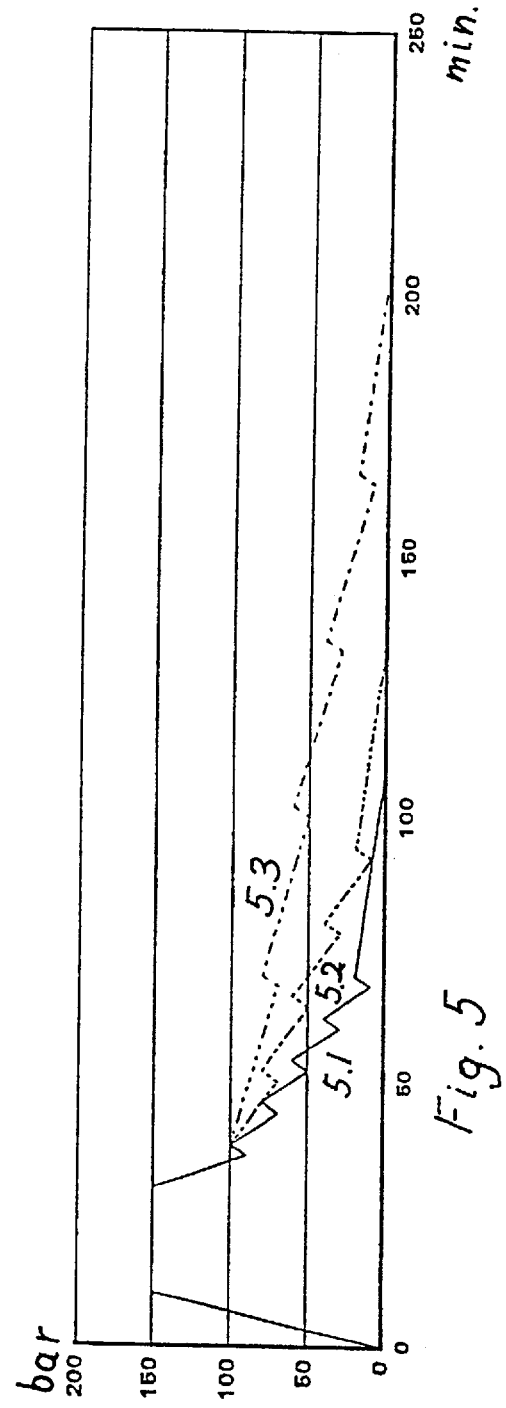

The pressure during the tests appears from FIG. 5.

As mentioned, the pressure increase and the impregnation-simulating residence time were as in tests 4.1, 4.2, 4.4 and 4.4 above. Thereafter a fast pressure decrease at −10 bar/min. down to a pressure somewhat above the critical pressure for the carbon dioxide, viz. 90 bar.

The pressure release was then conducted as a pulsating process in which the pressure in each operation is increased by 10 bar and decreased by 20 bar until a pressure of 20 bar is reached. This pulsating pressure decrease is in the below Table 2 termed "Pressure Decrease 1". From 20 bar the pressure is descreased to atmospheric pressure using a lower pressure decrease rate. This last part of the pressure release is in the below Table 2 termed "Pressure Decrease 2".

The three tests using pulsating pressure release are illustrated in FIG. 5 where the references 5.1, 5.2 and 5.3 correspond to those used in the below Table 2.

Test conditions and results are summarized in the below Table 2.

When the pressure was stabilized at 90 bar, gas replacement or purging were performed in approximately ten minutes by closing V6 and V11 and simultaneous opening of V7, V9 and V10. Thereafter the pressure was reduced down to 20 bar at a rate of −10, −5, −2 and −1 bar/min., resp., and thereafter, in all four tests, from 20 bar down to atmospheric pressure at a rate of −0.5 bar/min.

Test conditions and results are summarized in the below Table 2, in which the test numbers correspond to those used in FIG. 5.

TABLE 2

Pulsating pressure decrease.

| Test # | Pressure decrease 1 bar/min. | Pressure decrease 2 bar/min. | Process time min. | Result |
|---|---|---|---|---|
| 5.1 | −5 | −0.5 | 110 | Distinct, unacceptable resin exudation on end wood and autumn wood and around knots |
| 5.2 | −2.5 | −0.5 | 134 | Very slight and neglectible exudation on the end wood, at autumn wood and around knots |
| 5.3 | −1 | −0.5 | 206 | Very slight/neglectible resin exudation at the ends and around dense knots |

As it appears from Table 2 it is possible, when using the pulsating release step according to the invention to achieve an acceptable surface quality of the treated wood samples using a total process time of only approximately 2 hours. Thereby the process becomes highly competitive to the prior art processes.

What is claimed is:

1. A method of performing an impregnating treatment on a resin-containing wood substrate using a fluid in supercritical state as delivering solvent medium, which fluid in supercritical state is soluble in the resin present in the wood substrate, comprising the steps of:
   (i) introducing the wood substrate into a pressure tight treatment chamber,
   (ii) introducing a stream comprising said fluid into the chamber and adjusting the pressure and temperature therein to ensure the fluid being present in supercritical state and to promote penetration of the fluid and any substances dissolved therein into the wood substrate,
   (iii) maintaining contact between the wood substrate and the fluid in supercritical state for a time period sufficient to obtain the desired penetration, whereby also a certain dissolution of the fluid into the resin takes place,
   (iv) after a possible purging of the chamber with said fluid in supercritical state, releasing the pressure in the chamber down to ambient pressure to improve surface properties of the treated wood substrate, and
   (v) withdrawing the treated wood substrate from the chamber, characterized in that the releasing step (iv) comprises the features:
      (a) starting releasing the pressure at a rate which, if it were continued until atmospheric pressure were reached, would cause exudation of resin from the interior of the wood substrate to the surface thereof due to bubble forming expansion of the fluid dissolved in the resin in step (iii),
      (b) interruption said releasing at a first pressure level,
      (c) increasing the pressure to a second level above said first level but below the pressure maintained in step (iii),
      (d) immediately after reaching said second pressure level resuming pressure release to decrease the pressure to a third level below said first level,
      (e) subsequently at least once repeating a release operation comprising pressure increase to a level below the maximum level of the immediately preceding release operation, instantly followed by pressure decrease to a level below the minimum level of the immediately preceding release operation,
   wherein the number of release operations in (e) and the pressure levels in each of these operations as well as in the steps (b), (c) and (d) are previously fixed on basis of simple experiments, using relevant specimens of wood or resin, to obtain a shorter total release time (a)+, (b)+, (c)+, (d)+ and (e)+, than would have been possible if the pressure were released by a continuous, uninterrupted withdrawal of the fluid for a predetermined time.

2. A method according to claim 1, characterized in that the increase of pressure in (c) and is performed by introducing the same species of fluid as used as delivering supercritical solvent medium.

3. A method according to claim 2, characterized in that resinous wood from a coniferous tree is impregnated with at least one organic biocide using carbon dioxide as the supercritical fluid acting as delivering solvent medium, that the contact in step (iii) is maintained for 5–60 at a pressure of 20–500 bar and at a temperature of 31–80° C. and in that the step (iv) comprising the features (a), (b), (c), (d) and (e) is completed within a period of 0.5–5 h.

4. A method according to claim 3, characterized in that the feature (e) comprising 1–20 operations each consisting of a relatively fast pressure increasing measure and a slower pressure decreasing measure.

5. A method according to claim 4, characterized in that the features (e) comprises 3–10 operations each consisting of a relatively fast pressure increasing measure and a slower pressure decreasing measure.

6. A method according to claim 3, characterized in that the least one biocide is propiconazole or tebuconazole or both.

7. A method according to claim 3, characterized in that the biocide is dissolved in an organic solvent before being combined with the carbon dioxide in supercritical state.

8. A method according to claim 3, characterized in that the contact in step (iii) is maintained for 10–30 minutes at a pressure of 50–400 bar and at a temperature of 31–65° C. and in that step (iv) is completed within a period of 1.5–4 h.

9. A method according to claim 2, characterized in that the increase of pressure in (e) is performed by introducing the same species of fluid as used as delivering supercritical solvent medium.

10. A method according to claim 1, characterized in that the increase of pressure in (c) and also in (e) is performed by introducing a fluid which is less soluble in resin than the fluid used as delivering solvent medium.

11. A method according to claim 10, characterized in that the fluid less soluble in resin than the fluid used as delivering solvent medium is selected among nitrogen and atmospheric air.

12. A method according to claim 1, characterized in that wood from a coniferous tree is impregnated using a wood preserving agent comprising at least one fungicide or other biocide.

13. A method according to claim 1, characterized in that the fluid used in supercritical state as solvent medium is carbon dioxide or one or more hydrocarbons.

14. A method according to claim 1, characterized in that to increase the delivering ability of the fluid in supercritical state an organic co-solvent is added to said fluid.

15. A method according to claim 1, characterized in that the wood substrate is impregnated with one or more colorants, fireproofing agents or strength improving agents.

16. A method according to claim 15, characterized in that the contact in step (iii) is at a pressure of 60–150 bar and in that step (iv) is completed in a period of 100–200 minutes.

17. A method according to claim 1, characterized in that the fluid used in the supercritical state is carbon dioxide.

18. A method according to claim 1, characterized in that the wood is selected from the group consisting of spruce (pica), fir (abies, pseudotsuga), hemlock (tsuga) and pine (pinus) including larch (larix).

* * * * *